United States Patent [19]
Otomo

[11] Patent Number: 6,139,119
[45] Date of Patent: Oct. 31, 2000

[54] BRAKE STROKE SIMULATOR AND METHOD

[75] Inventor: Akihiro Otomo, Toyota, Japan

[73] Assignee: Toyota Jidosha Kabushiki Kaisha, Toyota, Japan

[21] Appl. No.: 09/126,588

[22] Filed: Jul. 31, 1998

[30] Foreign Application Priority Data

Aug. 8, 1997 [JP] Japan .................................. 9-215011

[51] Int. Cl.⁷ .......................... B60T 13/66; B60T 17/00; F15B 13/14
[52] U.S. Cl. .................................. 303/113.1; 303/115.1; 303/DIG. 11
[58] Field of Search ........................ 303/113.1, DIG. 11, 303/87, 114.1, 115.1, 114.2, DIG. 1, DIG. 2, DIG. 4, DIG. 3, 152; 60/550, 554, 533, 553, 586; 188/151 R, 358, 359, 115.4, 115.5

[56] References Cited

U.S. PATENT DOCUMENTS 4,730,877  3/1988  Seibert et al. ............................. 303/52
5,038,564  8/1991  Horiuchi et al. ........................... 60/550
5,312,172  5/1994  Takeuchi ................................. 303/113.1

FOREIGN PATENT DOCUMENTS 6-211124  8/1994  Japan .
7-165044  6/1995  Japan .

Primary Examiner—Douglas C. Butler
Attorney, Agent, or Firm—Oliff & Berridge, PLC

[57]  ABSTRACT

A brake stroke simulator for achieving good stroke feeling in a vehicular brake apparatus has a first piston being displaceable by receiving a master cylinder pressure, and a second piston disposed so as to form a gap between the second piston and the first piston. A plug is disposed so as to form another gap between the plug and the second piston. A first spring is disposed between the first piston and the second piston so as to urge the pistons away from each other. A second spring is provided for urging the second piston away from the plug. The brake stroke simulator is able to reduce the characteristic variations among individual products.

6 Claims, 4 Drawing Sheets

NORMAL BRAKE

STROKE SIMULATOR
(SINGLE-STAGE SPRING)

STROKE SIMULATOR
(TWO-STAGE SPRING)

BRAKE STROKE SIMULATOR AND METHOD

INCORPORATION BY REFERENCE

The disclosure of Japanese Patent Application No. HEI 9-215011 filed on Aug. 8, 1997 including the specification, drawings and abstract is incorporated herein by reference in its entirety.

BACKGROUND OF THE INVENTION

1. Field of Invention

The present invention relates to a brake stroke simulator and, more particularly, to a brake stroke simulator for achieving good stroke feeling in an electronic control brake apparatus for a vehicle.

2. Description of Related Art

A vehicular electronic brake apparatus having a brake stroke simulator is disclosed in, for example, Japanese Patent Application Laid-Open No. HEI 6-211124. In such a brake apparatus, the brake stroke simulator is connected in communication to a master cylinder that generates master cylinder pressure in accordance with the brake pedal depressing force.

This conventional brake apparatus has a high-pressure source that always generates a predetermined liquid pressure regardless of whether there is a brake pedal depressing force. At the time of depression of the brake pedal, the communication between the master cylinder and the wheel cylinders is shut down and the wheel cylinder pressure is regulated by using the high-pressure source as a liquid pressure source, as long as the brake system is operating normally. In this case, brake fluid from the master cylinder flows into the brake stroke simulator.

The brake stroke simulator provided in a brake apparatus as described above has a piston that is displaced by master cylinder pressure, and a plurality of disc springs that urge the piston in a direction opposite to the direction of the force caused by master cylinder pressure. The disc springs are superposed on top of each other. The disc springs produce a reaction force when the piston is displaced by master cylinder pressure. The displacement of the piston increases with increases in pedal stroke. The reaction force produced by the disc springs increases with increases in the piston displacement. Therefore, the reaction force by the disc springs increases with increases in pedal stroke.

The master cylinder pressure increases as the reaction force produced by the disc springs increases. A pedal reaction force that is transmitted to the brake pedal increases with increases in the master cylinder pressure. Therefore, the brake stroke simulator is able to increase the pedal reaction force as the depression of the brake pedal is increased.

In a normal manual brake apparatus (hereinafter, referred to as "normal brake apparatus"), the master cylinder pressure is directly supplied to the wheel cylinders. In this apparatus, the pedal reaction force is in a non-linear relation to the pedal stroke. More specifically, the pedal reaction force comparatively gently changes relative to changes in the pedal stroke if the pedal stroke is within a range of small strokes. If the pedal stroke is within a large stroke range, the pedal reaction force comparatively sharply changes with changes in the pedal stroke.

Such a non-linear characteristic of the pedal reaction force relative to the pedal stroke similar to that achieved in normal brake apparatuses can be achieved, by using a stack of spring discs as in the brake stroke simulator described above. Therefore, while the communication between the master cylinder and the wheel cylinders in the related-art brake apparatus is shut down, the related-art brake apparatus is able to provide pedal operating feeling similar to that provided by normal brake apparatuses.

However, the characteristic of the related-art brake stroke simulator varies as the superposed condition of the disc springs changes. It is difficult to always maintain a constant superposed condition of the disc springs in the production process of brake stroke simulators. Consequently, the conventional brake stroke simulators are subject to variations among individual simulators.

SUMMARY OF THE INVENTION

Accordingly, it is an object of the present invention to provide a brake stroke simulator that is able to reduce the characteristic variations among individual simulators manufactured.

One aspect of the invention provides a brake stroke simulator including a first piston being displaceable by receiving a master cylinder pressure, a second piston being movable together with the first piston when a moving distance of the first piston is equal to or greater than a predetermined distance, a first spring that urges the first piston and the second piston along the moving distance, and a second spring that urges the second piston toward the first piston an elastic member disposed in a contact position between the first piston and the second piston.

According to the first aspect of the invention, the relationship between the pedal stroke and the pedal reaction force is set on the basis of the spring force of a plurality of springs.

More specifically, in the invention, the first piston is displaced as the master cylinder pressure increases. Until the moving distance of the first piston reaches a predetermined distance, the second piston is not substantially displaced but only the first piston is displaced, accompanied by elastic deformation of the first spring. In the brake stroke simulator of the first aspect of the invention, the relationship between the pedal stroke and the pedal reaction force is determined by the factors of the first spring until the moving distance of the first spring increases to the predetermined distance, that is, until the first piston contacts the second piston. After the first piston contacts the second piston, the elastic member starts to be elastically deformed. When the elastic deformation of the elastic member sufficiently progresses, a state is established where the relationship between the pedal stroke and the pedal reaction force is determined by the factors of the second spring. During a period from the establishment of the contact of the first piston with the second piston until a sufficient amount of elastic deformation of the elastic member is achieved, the pedal reaction force characteristic smoothly changes from a characteristic determined by the factors of the first spring to a characteristic determined by the factors of the second spring. In a range where the moving distance of the first piston is greater than the predetermined distance, the second piston is displaced together with displacement of the first piston. In this process, the second spring starts to be elastically deformed, with the amount of elastic deformation of the first spring remaining at a constant value. Under this condition, the relationship between the pedal stroke and the pedal reaction force is substantially determined by the spring constant of the second spring.

Thus, in the brake stroke simulator of the invention, the relationship between the pedal stroke and the pedal reaction force established in a range of relatively small pedal strokes is different from the relationship between the pedal stroke and the pedal reaction force established in a range of relatively large pedal strokes. Such a non-linear characteristic achieved in the manner as described above can be approximated to the pedal reaction force characteristic achieved in the normal brake apparatus, by suitably setting the factors of the first spring and the factors of the second spring. Therefore, the brake stroke simulator of the invention is able to provide a stable pedal feel, that is, a stable pedal feeling, approximate to that provided by the normal brake apparatus, while limiting large variations among individual products.

The brake stroke simulator according to the first aspect of the invention may further include a housing in which the first piston is inserted, and a check valve-type cup seal provided between the first piston and the housing, for substantially preventing leakage of the master cylinder pressure. This construction is effective in reducing the hysteresis of the pedal reaction force.

As the pedal stroke increases, the first piston is moved toward the second piston. In this stage, the pedal reaction force becomes a value in accordance with the sum of the urging force produced by the first spring or the second spring and the sliding resistance of the first piston. As the pedal stroke decreases, the first piston is moved away from the second piston. In this stage, the pedal reaction force becomes a value in accordance with a force obtained by subtracting the sliding resistance of the first piston from the urging force produced by the first spring or the second spring. If a seal member is disposed around the first piston for securing seal between the first piston and the housing, the sliding resistance of the first spring is greatly affected by the sliding resistance between the seal member and the housing. If the seal member exhibits equal sliding resistances during increase of the pedal stroke and during decrease of the pedal stroke, the pedal reaction force becomes correspondingly greater during increase of the pedal stroke, and the pedal reaction force becomes correspondingly less during decrease of the pedal stroke.

In the construction where the first piston is provided with the check valve-type cup seal, the check valve-type cup seal is elastically deformed radially inwards, that is, in such directions as to reduce the diameter of the seal, during decrease of the pedal stroke, that is, during decrease of the master cylinder pressure. When the check valvetype cup seal is elastically deformed radially inwards, the sliding resistance of the first piston is reduced. Therefore, during decrease of the pedal stroke, the brake stroke simulator with this construction achieves the pedal reaction force substantially in accordance with the urging force produced by the first spring or the second spring. Since a relatively large pedal reaction force is thus achieved during decrease of the pedal stroke, the hysteresis of the pedal reaction force resulting from the sliding resistance of the seal member is reduced.

A second aspect of the invention provides a brake stroke simulator including a first piston being displaceable by receiving a master cylinder pressure, a second piston being displaceable by receiving the master cylinder pressure, at least one coil spring that urges the first piston and the second piston together in a direction opposite to a direction of force produced by the master cylinder pressure, and a piston stopper that makes a movable distance of the first piston less than a movable distance of the second piston. The at least one spring may be a coil spring that urges the first piston and the second piston together. The master cylinder pressure that moves the first piston to an end of displacement is different from the master cylinder pressure that moves the second piston to an end of displacement.

In the second aspect of the invention, both the first piston and the second pistons are urged by the single coil spring. The first and second pistons are displaced together in a range where the master cylinder pressure is less than a predetermined pressure. In this process, the relationship between the pedal stroke and the pedal reaction force is determined by the sum of the pressure-receiving area of the first piston and the pressure-receiving area of the second piston, and the factors of the coil spring.

In a range where the master cylinder pressure exceeds the predetermined pressure, the displacement of the first piston is prevented by the piston stopper. Therefore, in this range, only the second piston is displaced in accordance with the balance between the urging force caused by the master cylinder pressure and the urging force of the coil spring. In this stage, the relationship between the pedal stroke and the pedal reaction force is determined by the pressure-receiving area of the second piston and the factors of the coil spring.

In the second aspect of the invention, the relationship between the pedal stroke and the pedal reaction force established in a range of relatively small pedal strokes is different from that established in a range of relatively large pedal strokes, as described above. This non-linear characteristic can be approximated to the pedal reaction force characteristic achieved in the normal brake apparatus, by suitably setting the pressurereceiving areas of the first and second pistons, and the factors of the at least one spring for urging the first and second pistons. Therefore, according to the second aspect of the invention, it becomes possible to provide a stable brake pedal feel approximate to that provided by the normal brake apparatus while limiting large variations among individual brake apparatus products.

The brake stroke simulator according to the second aspect of the invention may further include a piston stopper that makes a movable distance of the first piston less than a movable distance of the second piston, and the at least one spring may be a coil spring that urges the first piston and the second piston together.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
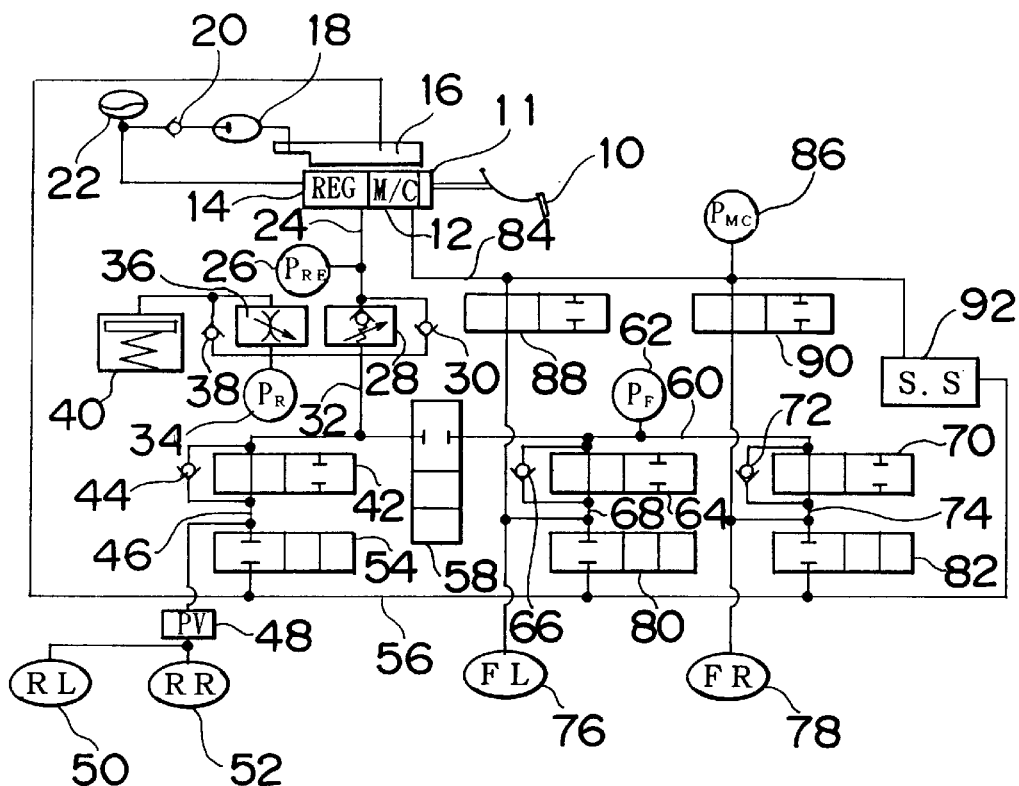
FIG. 1 shows a system arrangement of an electronic control brake apparatus to which various embodiments of the brake stroke simulator of the invention are applied.

FIG. 1 shows a system arrangement of an electronic control brake apparatus to which various embodiments of the brake stroke simulator of the invention are applied. The electronic control brake apparatus has a brake pedal 10 that is connected to a brake booster 11. The brake booster 11 is fixed to a master cylinder 12. The brake booster 11 amplifies brake depressing force applied to the brake pedal 10, and transmits the amplified force to the master cylinder 12. The master cylinder 12 generates therein master cylinder pressure $P_{MC}$ that has a predetermined boost ratio to the brake depressing force.

A regulator 14 is fixed to the master cylinder 12. A reservoir tank 16 is disposed above the master cylinder 12 and the regulator 14. The reservoir tank 16 contains brake fluid. The master cylinder 12 communicates with the reservoir tank 16 only while the brake pedal 10 is not depressed.

The brake apparatus has a pump 18. An intake opening of the pump 18 is connected to the reservoir tank 16. The pump 18 draws brake fluid from the reservoir tank 16 and ejects it from an ejection opening thereof. The ejection opening of the pump 18 is connected to an accumulator 22, via a check valve 20. The accumulator 22 accumulates the pressure of fluid ejected by the pump 18, as an accumulator pressure $P_{ACC}$. The pump 18 is driven so as to maintain the accumulator pressure $P_{ACC}$ within the range between an upper limit and a lower limit thereof.

The accumulator 22 is in communication with the regulator 14. The regulator 14 is in communication with the reservoir tank 16. The regulator 14 produces a regulator pressure $P_{RE}$ equal to the master cylinder pressure $P_{MC}$, using the accumulator 22 as a high pressure source, and the reservoir tank 16 as a low pressure source.

A regulator pressure passage 24 is connected to the regulator 14. The regulator pressure passage 24 is provided with a fluid pressure sensor 26 that outputs an electric signal pRE in accordance with the regulator pressure $P_{RE}$. The regulator pressure passage 24 is connected to an amplifying linear control valve 28 and a check valve 30. A control fluid pressure passage 32 is connected to the amplifying linear control valve 28 and the check valve 30. The amplifying linear control valve 28 is a control valve that allows brake fluid to flow from the regulator pressure passage 24 to the control fluid pressure passage 32 in an amount substantially proportional to a drive signal to the valve 28. The check valve 30 is a one-way valve that allows fluid to flow only in the direction from the control fluid pressure passage 32 to the regulator pressure passage 24.

The control fluid pressure passage 32 is provided with a fluid pressure sensor 34 that outputs an electric signal pR in accordance with the pressure inside the control fluid pressure passage 32. The control fluid pressure passage 32 is connected to an auxiliary reservoir 40, via a pressure-reducing linear control valve 36 and a check valve 38. The pressure-reducing linear control valve 36 is a control valve that allows brake fluid to flow from the control fluid pressure passage 32 to the auxiliary reservoir 40 in an amount substantially proportional to a drive signal to the valve 36. The check valve 38 is a one-way valve that allows fluid to flow only in the direction from the auxiliary reservoir 40 to the control fluid pressure passage 32. The auxiliary reservoir 40 is capable of retaining a predetermined amount of brake fluid.

The control fluid pressure passage 32 is connected to a rear fluid pressure passage 46, via a retaining solenoid valve 42 and a check valve 44. The retaining solenoid valve 42 is a two-position electromagnetic valve that remains open in a normal state and becomes closed when supplied with a drive signal. The check valve 44 is a one-way valve that allows fluid to flow only in the direction from the rear fluid pressure passage 46 to the control fluid pressure passage 32.

The rear fluid pressure passage 46 is connected to left and right rear wheel cylinders 50, 52, via a proportioning valve 48. The rear fluid pressure passage 46 is also connected to a reservoir passage 56, via a pressure-reducing solenoid valve 54. The proportioning valve 48 supplies the fluid pressure in the rear fluid pressure passage 46 directly to the wheel cylinders 50, 52 if the fluid pressure is less than a predetermined value. If the fluid pressure in the rear fluid pressure passage 46 is greater than the predetermined value, the proportioning valve 48 reduces the fluid pressure to a predetermined proportion, and supplies the reduced pressure to the wheel cylinders 50, 52. The pressure-reducing solenoid valve 54 is a two-position electromagnetic valve that remains closed in the normal state and becomes open when supplied with a drive signal. The reservoir passage 56 is connected to the reservoir tank 16 described above.

The control fluid pressure passage 32 is connected to a front fluid pressure passage 60, via a pressure-increasing cut valve 58. The pressure-increasing cut valve 58 is a two-position electromagnetic valve that remains closed in the normal state and becomes open when supplied with a drive signal. The front fluid pressure passage 60 is provided with a fluid pressure sensor 62 that outputs an output signal pF in accordance with the internal pressure in the passage 60.

The front fluid pressure passage 60 is connected to a front-left fluid pressure passage 68, via a retaining solenoid valve 64 and a check valve 66. The front fluid pressure passage 60 is also connected to a front-right fluid pressure passage 74, via a retaining solenoid valve 70 and a check valve 72. The retaining solenoid valves 64, 70 are two-position electromagnetic valves that remain open in the normal state and become closed when supplied with a drive signal. The check valves 66, 72 are one-way valves that allow fluid to flow only in the direction from the front-left fluid pressure passage 68 to the front fluid pressure passage 60 and in the direction from the frontright fluid pressure passage 74 to the front fluid pressure passage 60, respectively.

The front-left fluid pressure passage 68 and the front-right fluid pressure passage 74 are connected to left and right front wheel cylinders 76, 78, respectively. The front-left fluid pressure passage 68 and the front-right fluid pressure passage 74 are also connected to the reservoir passage 56, via pressure-reducing solenoid valves 80, 82, respectively. The pressure-reducing solenoid valves 80, 82 are two-position electromagnetic valves that remain closed in the normal state and become open when supplied with a drive signal.

A master pressure passage 84 is connected to the master cylinder 12. The master pressure passage 84 is provided with a master pressure sensor 86 that outputs an electric signal pMC in accordance with the master cylinder pressure PMC. The master pressure passage 84 is connected to the front-left fluid pressure passage 68 and the front-right fluid pressure passage 74, via master cut valves 88, 90, respectively. The master cut valves 88, 90 are two-position electromagnetic valves that remain open in the normal state and become closed when supplied with a drive signal. The master pressure passage 84 is also connected to a brake stroke simulator 92. The brake stroke simulator 92 is in communication with the reservoir passage 56, as well as with the master pressure passage 84.

Figure 2:
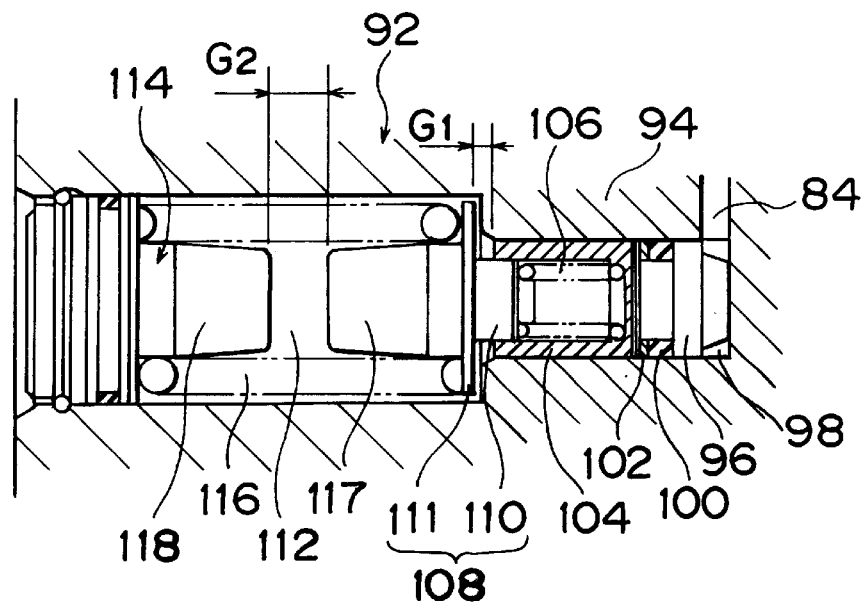
FIG. 2 is a sectional view of the brake stroke simulator according to a first embodiment of the invention.

FIG. 2 shows a sectional view of the brake stroke simulator 92 in accordance with the invention. The brake stroke simulator 92 has a housing 94 that contains a first piston 96. The first piston 96 partially defines a master pressure chamber 98 within the housing 94. The master pressure chamber 98 communicates with the master pressure passage 84.

The first piston 96 is provided with an O-ring 100 and a backup ring 102. The gap between the first piston 96 and the housing 94 is sealed by the O-ring 100. The first piston 96 has a tubular portion 104. A first spring 106 is disposed inside the tubular portion 104. The brake stroke simulator 92 also has a second piston 108 that has a fitting portion 110 and a flange portion 111. The fitting portion 110 is slidably inserted into the tubular portion 104 of the first piston 96.

In FIG. 2, the first piston 96 and the second piston 108 are positioned at home positions. The brake stroke simulator 92 is designed so that when both the first piston 96 and the second piston 108 are at the home positions, a gap G1 of a predetermined size is formed between an end of the first piston 96 and the flange portion 111 of the second piston 108 as indicated in FIG. 2.

The first spring 106 is in contact with an end surface of the fitting portion 110 of the second piston 108. The first spring 106 urges the first piston 96 and the second piston 108 in separating directions. When a master cylinder pressure $P_{MC}$ comparable to the urging force of the first spring 106 is introduced into the master pressure chamber 98, the first piston 96 is displaced toward the second piston 108 while elastically deforming the first spring 106. When the displacement of the first piston 96 becomes equal to the gap size G1, the first piston 96 contacts the second piston 108. After the first piston 96 has contacted the second piston 108, the force applied to the first piston 96 by the master cylinder pressure $P_{MC}$ introduced into the master pressure chamber 98 is transmitted to the second piston 108.

A drain chamber 112 is defined in the housing 94. The drain chamber 112 is closed by a plug 114. The drain chamber 112 is in communication with the reservoir passage 56 at a site (not shown) in the drain chamber 112. A second spring 116 is disposed between the second piston 108 and the plug 114. The second spring 116 produces force that urges the second piston 108 and the plug 114 in separating directions. When force is transmitted from the first piston 96 to the second piston 108, the second piston 108 is displaced toward the plug 114.

The second piston 108 and the plug 114 have stoppers 117, 118, respectively. The brake stroke simulator 92 is designed so that a predetermined size gap G2 is formed between the stopper 117 and the stopper 118 when the second piston 108 is at the home position. Therefore, the second piston 108 can be displaced toward the plug 114 until the stopper 117 contacts the stopper 118. Consequently, the first piston 96 can be moved the predetermined distance G1+G2 from the home position toward the plug 114.

The capacity of the master pressure chamber 98 varies with displacement of the first piston 96. The capacity of the master pressure chamber 98 increases by an amount of $\pi \cdot D1 \cdot (G1+G2)$ with a displacement of G1+G2 of the first piston 96 from the home position, where D1 is a diameter of the first piston 96. Consequently, the brake stroke simulator 92 is able to hold a maximum amount of brake fluid expressed as $\pi \cdot D1 \cdot (G1+G2)$ when the master cylinder pressure $P_{MC}$ is supplied from the master pressure passage 84.

The brake apparatus shown in FIG. 1 performs brake fluid pressure control at the time of brake operation performed by a driving person, as long as the system functions normally. The brake fluid pressure control is performed by closing the master cut valves 88, 90 (on-state) and opening the pressure-increasing cut valve 58 (on-state) and suitably controlling the amplifying linear control valve 28 and the pressure-reducing linear control valve 36.

By the brake fluid pressure control, the wheel cylinders 76, 78 at the left and right front wheels FL, FR can be shut off from the master cylinder 12 and connected to the control fluid pressure passage 32 while the wheel cylinders 50, 52 at the left and right rear wheels RL, RR are allowed to remain in communication with the control fluid pressure passage 32. Therefore, the brake fluid pressure control is able to control the wheel cylinder pressure $P_{WC}$ in all the wheel cylinders using the regulator 14 as a fluid pressure source.

The regulator 14 produces the regulator pressure $P_{RE}$ equal to the master cylinder pressure $P_{MC}$ as described above. Therefore, during the brake fluid pressure control, any fluid pressure less than or substantially equal to the master cylinder pressure $P_{MC}$ can be supplied to the wheel cylinders 50, 52 at the left and right rear wheels FL, FR and the wheel cylinders 76, 78 at the left and right rear wheels RL, RR, by suitably controlling the amplifying linear control valve 28 and the pressure-reducing linear control valve 36.

If there occurs a failure that impedes performance of the brake fluid pressure control, the brake apparatus shown in FIG. 1 prevents performance of the brake fluid pressure control. In such a case, after the brake fluid pressure control is started, the master cut valves 88, 90 are held in the open state (off-state) and the pressure-increasing cut valve 58 is held in the closed state (off-state).

When the master cut valves 88, 90 and the pressure-increasing cut valve 58 are held in the off-state, a state is maintained where the wheel cylinders 76, 78 at the left and right front wheels FL, FR are in communication with the master cylinder 12 and where the wheel cylinders 50, 52 at the left and right rear wheels RL, RR are in communication with the regulator 14, via the amplifying linear control valve 28. In this state, the master cylinder pressure $P_{MC}$ can be introduced into the wheel cylinders 76, 78 at the left and right front wheels FL, FR, and a pressure obtained by subtracting the pressure for opening the amplifying linear control valve 28 from the regulator pressure $P_{RE}$ can be introduced to the wheel cylinders 50, 52 at the left and right rear wheels RL, RR. Therefore, the brake apparatus shown in FIG. 1 is able to reliably produce a sufficient braking force even if there is a failure in the system.

During the brake fluid pressure control, the amount of brake fluid in the master cylinder 12 is not supplied to the wheel cylinders 76, 78, as described above. The brake pedal 10 can be stroked since brake fluid flows out of the master cylinder 12. However, if brake fluid is prevented from flowing out of the master cylinder 12 during the brake fluid pressure control, it is impossible to provide brake feeling equivalent to that provided by a normal brake apparatus.

In the brake apparatus shown in FIG. 1, the brake stroke simulator 92 is able to hold a predetermined amount of brake fluid supplied from the side of the master pressure passage 84. Therefore, when the brake fluid pressure control is performed in the brake apparatus shown in FIG. 1, brake fluid is sent and received between the master cylinder 12 and the brake stroke simulator 92. Consequently, in the brake apparatus shown in FIG. 1, the master cylinder 12 can be appropriately stroked during the brake fluid pressure control.

In a brake apparatus that uses a brake stroke simulator to secure a brake pedal stroke, the relationship between the pedal stroke and the pedal reaction force is determined by the characteristic of the brake stroke simulator. The brake stroke simulator 92 according to this embodiment has a simple construction such that characteristic variations among individual products are unlikely. Another feature of the brake stroke simulator 92 is that the simulator 92 is able to achieve a relationship between the pedal stroke and the pedal reaction force similar to that in the normal brake apparatus. The features of the brake stroke simulator 92 of this embodiment will be described below with reference to FIG. 2 and FIGS. 3 through 5.

Figure 3:
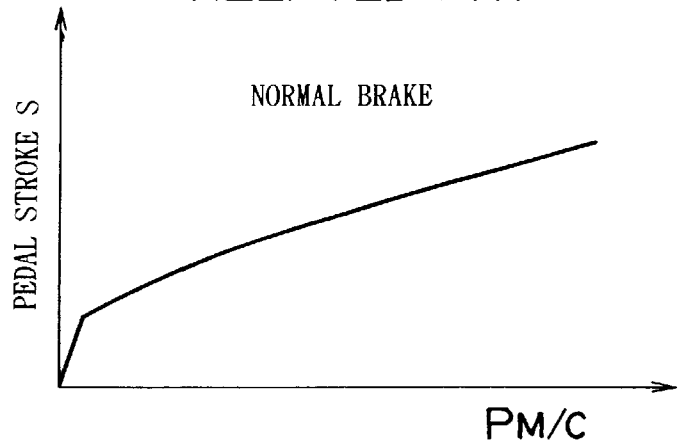
FIG. 3 is a graph indicating the relationship between the master cylinder pressure $P_{MC}$ and the pedal stroke S achieved by a conventional normal brake apparatus.

FIG. 3 indicates the relationship between the master cylinder pressure $P_{MC}$ and the pedal stroke S achieved by a normal brake apparatus, that is, an apparatus that controls the wheel cylinder pressure $P_{WC}$ using a master cylinder as a fluid pressure source. The brake pedal produces reaction force in accordance with the master cylinder pressure $P_{MC}$. Therefore, the relationship indicated in FIG. 3 can be regarded as the relationship between the pedal reaction force and the pedal stroke established in a normal brake apparatus.

In the normal brake apparatus, the amount of brake fluid $Q_{MC}$ that flows out of the master cylinder is always proportional to the pedal stroke S. During a period from the start of a braking operation until the brake fluid pressure increases to a certain level, brake fluid that flows out of the master cylinder is partially consumed for expansion of brake hoses and the like. Therefore, in the normal brake apparatus, the gradient of change of the master cylinder pressure $P_{MC}$ relative to the pedal stroke S, that is, the differential $dP_{MC}/dS$ of the master cylinder pressure $P_{MC}$ relative to the pedal stroke S, is relatively small within a range of small pedal strokes, and it is relatively large within a range of large pedal strokes, as indicated in FIG. 3.

Figure 4:
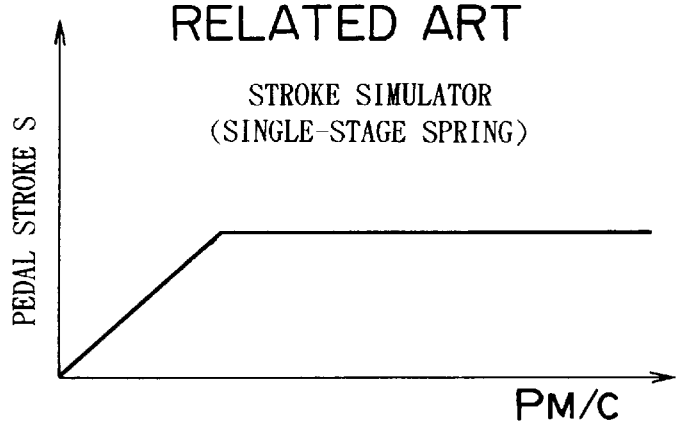
FIG. 4 is a graph indicating the relationship between the master cylinder pressure $P_{MC}$ and the pedal stroke S achieved by a related-art brake stroke simulator.

FIG. 4 indicates the relationship between the master cylinder pressure $P_{MC}$ and the pedal stroke S achieved by a related-art brake stroke simulator that has only one spring stage. A brake stroke simulator of this type has a piston that is displaced by the master cylinder pressure $P_{MC}$, and a spring that urges the piston toward its home position.

The amount of brake fluid $Q_{MC}$ that flows out of the master cylinder is proportional to the pedal stroke S as described above. In a brake apparatus having a brake stroke simulator, the entire amount of brake fluid $Q_{MC}$ from the master cylinder flows into the brake stroke simulator. Therefore, the piston provided in the brake stroke simulator is displaced by an amount proportional to the amount of brake fluid $Q_{MC}$ that flows out of the master cylinder, that is, proportional to the pedal stroke S.

In the related-art brake stroke simulator described above, one spring that urges the piston undergoes an amount of elastic deformation equal to the amount of movement of the piston. The spring produces reaction force in accordance with the amount of elastic deformation. Therefore, in the brake stroke simulator of the type described above, reaction force proportional to the pedal stroke S is produced in the piston until the piston reaches the end of displacement. In the fluid pressure passage from the master cylinder to the brake stroke simulator, master cylinder pressure $P_{MC}$ proportional to the reaction force transmitted to the piston occurs.

Consequently, the brake stroke simulator as described above is able to change the master cylinder pressure $P_{MC}$ linearly relative to changes in the pedal stroke S within a range where the piston does not reach the end of displacement, that is, a range where the pedal stroke is relatively small, as indicated in FIG. 4. However, in the normal brake apparatus, the master cylinder pressure $P_{MC}$ exhibits a non-linear changing tendency relative to changes in the pedal stroke S, as indicated in FIG. 3. Therefore, the related-art brake stroke simulator employing only one spring stage finds it difficult to accurately reproduce the relationship between the master cylinder pressure $P_{MC}$ and the pedal stroke S established in the normal brake apparatus.

Figure 5:
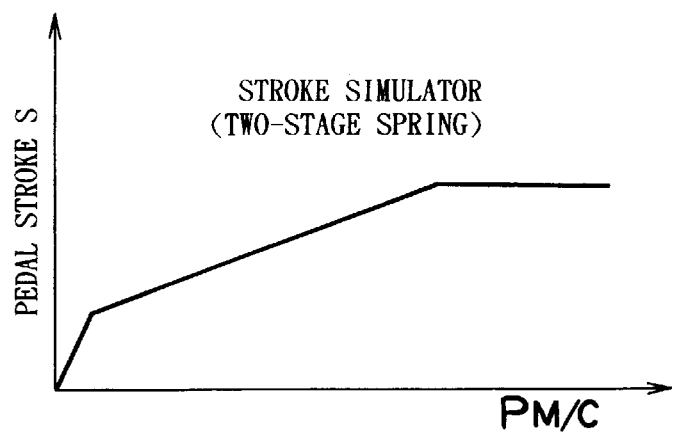
FIG. 5 is a graph indicating the relationship between the master cylinder pressure $P_{MC}$ and the pedal stroke S achieved by the brake stroke simulator of the first embodiment.

FIG. 5 indicates the relationship between the master cylinder pressure $P_{MC}$ and the pedal stroke S achieved by a brake apparatus employing the brake stroke simulator 92 of this embodiment. The brake stroke simulator 92 displaces only the first piston 96 while the second piston 108 remains still, in a range where the master cylinder pressure $P_{MC}$ introduced to the master pressure chamber 98 is small. Under such a condition, the urging force of the first spring 106 is transmitted, as reaction force, to the first piston 96. In this case, a linear relationship in accordance with factors of the first spring 106, that is, the spring constant, natural length and the like of the first spring 106, is established between the master cylinder pressure $P_{MC}$ and the pedal stroke S.

In a range where the master cylinder pressure $P_{MC}$ introduced into the master pressure chamber 98 is large so that the first piston 96 is brought into contact with the second piston 108, the brake stroke simulator 92 displaces the second piston 108 together with the first piston 96. Under such a condition, the urging force of the second spring 116 is transmitted, as reaction force, to the first piston 96. In this case, a linear relationship in accordance with factors of the second spring 116, that is, the spring constant, natural length and the like of the second spring 116, is established between the master cylinder pressure $P_{MC}$ and the pedal stroke S.

In short, the brake stroke simulator 92 of this embodiment is able to establish, a relationship between the master cylinder pressure $P_{MC}$ and the pedal stroke S in accordance with the factors of the first spring 106 in a range where the master cylinder pressure $P_{MC}$ is relatively small, and a relationship therebetween in accordance with the factors of the second spring 116 in a range where the master cylinder pressure $P_{MC}$ is relatively large. Therefore, the brake stroke simulator 92 is able to establish a non-linear relationship between the master cylinder pressure $P_{MC}$ and the pedal stroke S similar to the relationship established in the normal brake apparatus, as indicated in FIG. 5.

The characteristic of the brake stroke simulator 92 of this embodiment is determined by the factors of the first spring 106 and the factors of the second spring 116, as described above. The variations of these factors can be relatively easily reduced to small ranges during the production process of the first spring 106 and the production process of the second spring 116. Therefore, the brake stroke simulator 92 of this embodiment makes it possible to easily secure constant quality without allowing large characteristic variations among individual simulators manufactured.

Figure 6:
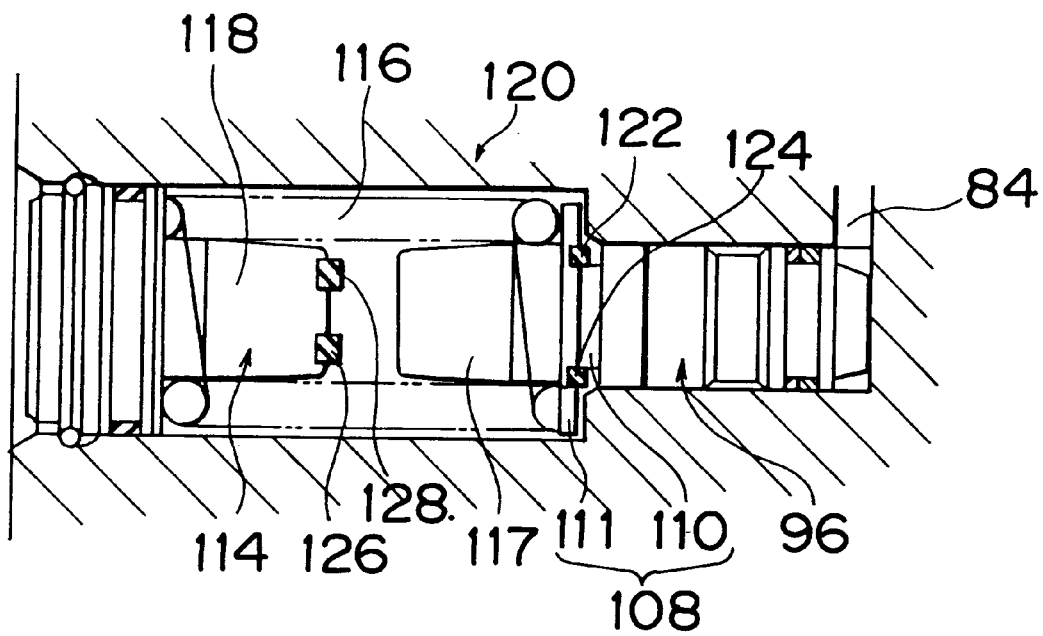
FIG. 6 is a sectional view of a brake stroke simulator according to a second embodiment of the invention.

A second embodiment of the invention will be described with reference to FIG. 6. FIG. 6 shows a sectional view of a brake stroke simulator 120 according to the second embodiment. Components and portions comparable to those shown in FIG. 2 are represented by comparable reference characters in FIG. 6, and will not be described again.

The brake stroke simulator 120 of the second embodiment has elastic members 122, 124, 126, 128. The elastic members 122, 124 are disposed on a flange portion 111 of a second piston 108. The elastic members 122, 124 contact an end surface of a first piston 96 when the first piston 96 is displaced toward the second piston 108 a distance greater than a predetermined distance. The elastic members 126, 128 are disposed on a stopper 118 of a plug 114, and contact a stopper 117 of the second piston 108 when the second piston 108 is displaced toward the plug 114 a distance greater than a predetermined distance.

In the brake stroke simulator 120, until the first piston 96 comes into contact with the elastic members 122, 124, only the reaction force of the first spring 106 (see FIG. 2) is transmitted to the first piston 96. In this stage, the relationship between the pedal stroke S and the pedal reaction force is substantially determined by the factors of the first spring 106.

After the first piston 96 has come into contact with the elastic members 122, 124, the reaction force of the first spring 106 and the reaction force of the second spring 116 are transmitted to the first piston 96 until the second piston 108 starts to be substantially displaced. In this stage, the relationship between the pedal stroke S and the pedal reaction force is substantially determined by the factors of the first spring 106 and the spring constant of the elastic members 122, 124.

The spring constant of the elastic members 122, 124 increases with increases in the amount of elastic deformation thereof. Therefore, the spring constant of the elastic members 122, 124 increases with increases in the displacement of the first piston 96. The relationship between the pedal stroke S and the pedal reaction force is largely dependent on the factors of the first spring 106 when the spring constant of the elastic members 122, 124 is relatively small. As the spring constant of the elastic members 122, 124 becomes larger, the spring constant of the elastic members 122, 124 more greatly affects the relationship between the pedal stroke S and the pedal reaction force. Therefore, in a brake apparatus employing the brake stroke simulator 120, after the first piston 96 comes into contact with the elastic members 122, 124, the relationship between the pedal stroke S and the pedal reaction force change gradually and smoothly from the relationship substantially determined by the factors of the first spring 106 to the relationship that is relatively largely dependent on the spring constant of the elastic members 122, 124.

When the elastic deformation of the elastic members 122, 124 sufficiently progresses so that the urging force transmitted from the elastic members 122, 124 and the first spring 106 to the second piston 108 becomes sufficiently large, displacement of the second piston 108 substantially starts. In this stage, the relationship between the pedal stroke S and the pedal reaction force is substantially determined by the factors of the second spring 116 and the spring constant of the elastic members 122, 124.

Under the condition described above, the effect of the spring constant of the elastic members 122, 124 on the relationship between the pedal stroke S and the pedal reaction force decreases as a change in the amount of elastic deformation of the elastic members 122, 124 becomes more difficult, that is, as the spring constant of the elastic members 122, 124 increases. Therefore, as the displacement of the second piston 108 increases, the relationship between the pedal stroke S and the pedal reaction force changes gradually and smoothly from the relationship that is substantially determined by the factors of the second spring 116 and the spring constant of the elastic members 122, 124 to the relationship that is substantially determined by the factors of the second spring 116.

When the second piston 108 is sufficiently displaced, the second piston 108 comes into contact with the elastic members 126, 128. After the contact of the second piston 108 with the elastic members 126, 128 has been established, the relationship between the pedal stroke S and the pedal reaction force becomes dependent mainly on the factors of the second spring 116 and the spring constant of the elastic members 126, 128.

The spring constant of the elastic members 126, 128 increases as the amount of elastic deformation of the elastic members 126, 128 increases. The relationship between the pedal stroke S and the pedal reaction force is largely dependent on the factors of the second spring 116 when the spring constant of the elastic members 126, 128 is relatively small. Therefore, immediately after the second piston 108 has come into contact with the elastic members 126, 128, the relationship between the pedal stroke S and the pedal reaction force is dependent mainly on the factors of the second spring 116. As the displacement of the second piston 108 further increases, the relationship between the pedal stroke S and the pedal reaction force changes gradually and smoothly toward the relationship that is established after the second piston 108 reaches the end of displacement.

In short, the brake stroke simulator 120 of this embodiment is able to gradually and smoothly change the relationship between the pedal stroke S and the pedal reaction force from the relationship that is determined by the factors of the first spring 106 to the relationship that is determined by the factors of the second spring 116, and from the relationship determined by the factors of the second spring 116 to the relationship established after the second piston 108 reaches the end of displacement. Therefore, the brake stroke simulator 120 is able to provide good brake feeling without a sharp change in the pedal reaction force changing rate.

Figure 7:
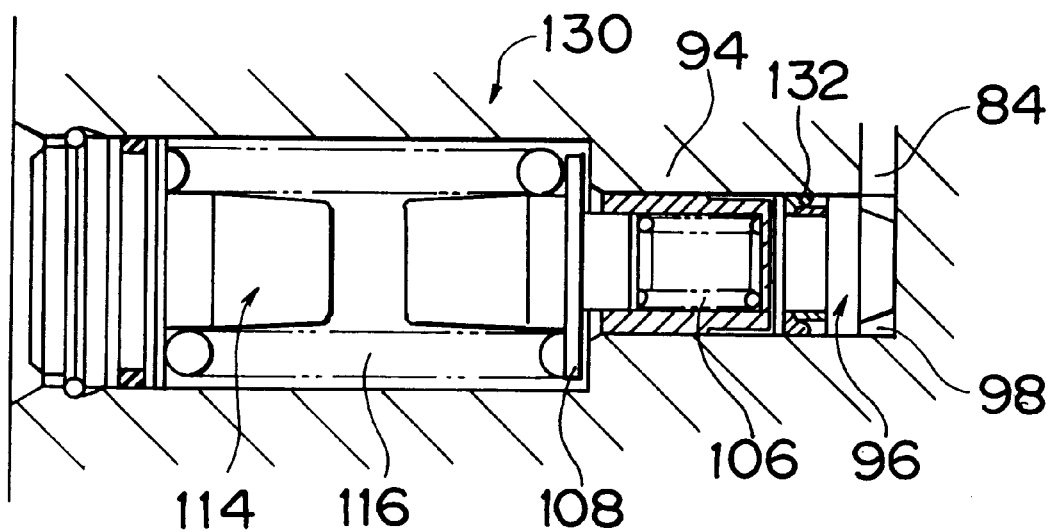
FIG. 7 is a sectional view of a brake stroke simulator according to a third embodiment of the invention.

A third embodiment of the invention will be described with reference to FIG. 7. FIG. 7 shows a sectional view of a brake stroke simulator 130 according to the third embodiment. Components and portions comparable to those shown in FIG. 2 are represented by comparable reference characters in FIG. 7, and will not be described again.

The brake stroke simulator 130 of this embodiment has a check valve-type cup seal 132 that is disposed on a first piston 96. The check valve-type cup seal 132 is a seal member formed of an elastic material. When the master cylinder pressure $P_{MC}$ in a master pressure chamber 98 increases, the check valve-type cup seal 132 is elastically deformed radially outwards so as to enhance the sealing between the first piston 96 and a housing 94.

In a brake apparatus employing the brake stroke simulator 130, brake fluid flows into the master pressure chamber 98 as the pedal stroke S increases. As brake fluid flows into the master pressure chamber 98, the first piston 96 is displaced toward a plug 114 with the check valve-type cup seal 132 being in close contact with the housing 94. In this stage, the master cylinder pressure $P_{MC}$ in accordance with the sum of the urging force of a first spring 106 or a second spring 116 that presses the first piston 96 and the sliding resistance between the check valve-type cup seal 132 and the housing 94 occurs in the master pressure chamber 98.

As the pedal stroke S decreases in the brake apparatus employing the brake stroke simulator 130, brake fluid flows out of the master pressure chamber 98 toward the master cylinder. As brake fluid flows out of the master pressure chamber 98, the first piston 96 is displaced toward the home position with the check valve-type cup seal 132 being in close contact with the housing 94. In this stage, the master cylinder pressure $P_{MC}$ in accordance with a force obtained by subtracting the sliding resistance between the check valve-type cup seal 132 and the housing 94 from the urging force of the first spring 106 or the second spring 116 pressing the first piston 96 occurs in the master pressure chamber 98.

In the brake stroke simulator 130, the sliding resistance between the check valve-type cup seal 132 and the housing 94 is reflected on the master cylinder pressure $P_{MC}$, as described above. Therefore, in the brake apparatus employing the brake stroke simulator 130, the master cylinder pressure $P_{MC}$, that is, the pedal reaction force, tends to become relatively large during increase in the pedal stroke S, and tends to become relatively small during decrease in the pedal stroke S.

In short, in the brake stroke simulator 130 of this embodiment, the pedal reaction force exhibits a hysteresis characteristic during increase and decrease in the pedal stroke S. The hysteresis characteristic of the pedal reaction force is reduced as the sliding resistance between the check valve-type cup seal 132 and the housing 94 decreases. The check valve-type cup seal 132 in this embodiment is elastically deformed radially outwards so as to enhance the close contact with the housing 94 during increase in the pedal stroke S. Therefore, a large sliding resistance occurs between the check valve-type cup seal 132 and the housing 94. During decrease in the pedal stroke S, elastic deformation of the check valve-type cup seal 132 in radially inward directions occurs. Therefore, the sliding resistance between the check valve-type cup seal 132 and the housing 94 is reduced to a relatively small value.

The brake stroke simulator 92 of the first embodiment is provided with the O-ring 100 for providing seal between the first piston 96 and the housing 94, as described above. The O-ring 100 produces substantially equal sliding resistances during increase of the pedal stroke S and during decrease thereof. Therefore, the brake stroke simulator 92 of the first embodiment tends to cause relatively great hysteresis of the pedal reaction force.

The check valve-type cup seal 132 in the third embodiment is designed so that when elastically deformed radially outwards, the check valve-type cup seal 132 produces sliding resistance substantially equivalent to that produced by the O-ring 100 in the first embodiment, and so that when elastically deformed radially inwards, the check valve-type cup seal 132 produces sliding resistance considerably smaller than that produced by the O-ring 100. Consequently, the brake stroke simulator 130 of the third embodiment produces larger pedal reaction force than the brake stroke simulator 92 of the first embodiment, during decrease of the pedal stroke S. That is, the brake stroke simulator 130 reduces the hysteresis of the pedal reaction force occurring during increase and decrease of the pedal stroke S. Therefore, the brake stroke simulator 130 of the third embodiment achieves further improved brake feeling.

Figure 8:
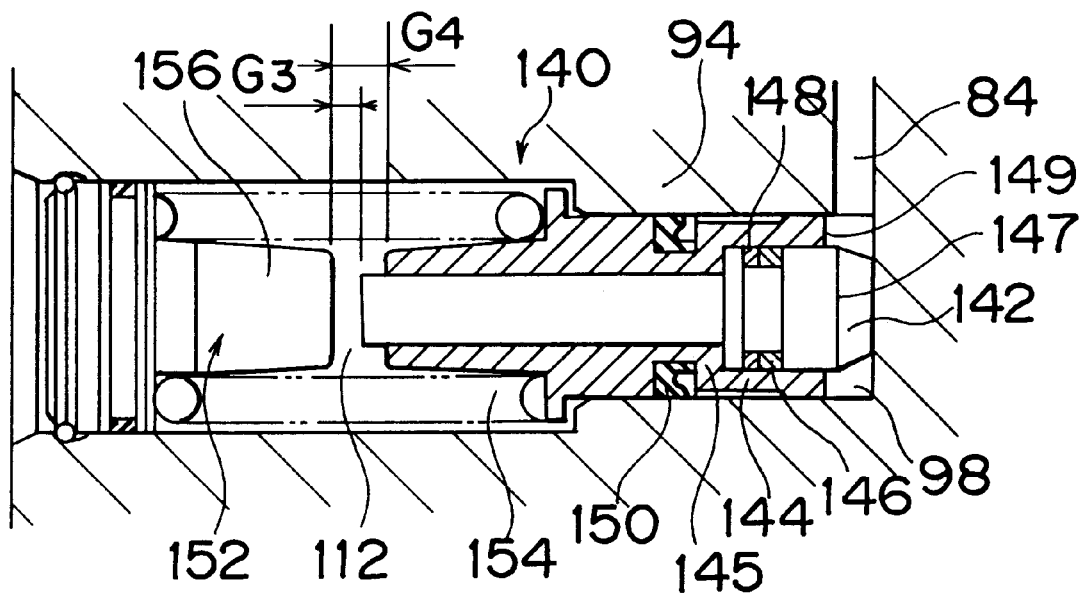
FIG. 8 is a sectional view of a brake stroke simulator according to a fourth embodiment of the invention.

A fourth embodiment of the invention will be described with reference to FIG. 8. FIG. 8 shows a sectional view of a brake stroke simulator 140 according to the fourth embodiment. Components and portions comparable to those shown in FIG. 2 are represented by comparable reference characters in FIG. 8, and will not be described again.

The brake stroke simulator 140 of this embodiment has what will be referred to as a third piston 142 and a fourth piston 144 within a housing 94. The third piston 142 is disposed slidably inside the fourth piston 144. The fourth piston 144 has a stepped portion 145 for restricting the displacement of the third piston 142. The third piston 142 can be moved to the left in FIG. 8 relative to the fourth piston 144 until the third piston 142 contacts the stepped portion 145.

Both an end face 147 of the third piston 142 and an end face 149 of the fourth piston 144 are exposed to a master pressure chamber 98. The end face 147 of the third piston 142 exposed to the master pressure chamber 98 has a sectional area of A3. The end face 149 of the fourth piston 144 exposed to the master pressure chamber 98 has a sectional area of A4. Therefore, when master cylinder pressure $P_{MC}$ occurs in the master pressure chamber 98, the third piston 142 and the fourth piston 144 receive forces F3 and F4 expressed by F3=$P_{MC}$•A3 and F4=$P_{MC}$•A4, respectively to the left in FIG. 8.

The third piston 142 is provided with an O-ring 146 and a backup ring 148. The O-ring 146 seals the gap between the third piston 142 and the fourth piston 144. The fourth piston 144 is provided with a check valve-type cup seal 150. The check valve-type cup seal 150 seals the gap between the fourth piston 144 and the housing 94.

A plug 152 is fitted to the housing 94, thereby closing a drain chamber 112. A coil spring 154 is disposed between the plug 152 and the fourth piston 144. The coil spring 154 produces force that urges the fourth piston 144 away from the plug 152. The third piston 142 and the fourth piston 144 are displaced toward the plug 152 when master cylinder pressure $P_{MC}$ in the master pressure chamber 98 increases and overcomes the urging force of the coil spring 154.

The plug 152 has a piston stopper 156. In FIG. 8, the third piston 142 and the fourth piston 144 are positioned at their home positions. The brake stroke simulator 140 is designed so that when the third piston 142 and the fourth piston 144 are at the home positions, a predetermined-size gap G3 or G4 (>G3) is formed between the third piston 142 and the fourth piston 144, respectively, and the piston stopper 156, as indicated in FIG. 8. The third piston 142 and the fourth piston 144 can be displaced toward the plug 152 until they respectively contact the piston stopper 156. Therefore, the third piston 142 and the fourth piston 144 can be moved the predetermined distances G3 and G4 from the home positions, respectively, toward the plug 152.

In a brake apparatus employing the brake stroke simulator 140 of this embodiment, brake fluid flows into the master pressure chamber 98 during increase of the pedal stroke S. As brake fluid flows into the master pressure chamber 98, the third piston 142 and the fourth piston 144 are displaced toward the plug 152. In this stage, the relationship between the quantity of brake fluid $Q_{MC}$ that flows into the master pressure chamber 98 and the displacement L of the third piston 142 and the fourth piston 144 can be expressed as follows:

$$Q_{MC}=L•(A3+A4) \quad (1)$$

Assuming that the amount of elastic deformation of the coil spring 154 equals the displacement L, the relationship between the displacement L and the master cylinder pressure $P_{MC}$ can be expressed as in the following equation using the spring constant K of the coil spring 154.

$$K•L=P_{MC}•(A3+A4) \quad (2)$$

From equations (1) and (2), the relationship between the quantity of brake fluid inflow $Q_{MC}$ and the master cylinder pressure $P_{MC}$ can be written as:

$$P_{MC} = K \cdot Q_{MC}/(A3+A4)^2 \quad (3)$$

A substantially proportional relationship is established between the quantity of brake fluid inflow $Q_{MC}$ and the pedal stroke S. Therefore, using equation (3), the relationship between the pedal stroke S and the master cylinder pressure $P_{MC}$ can be expressed as:

$$P_{MC} = \{K'/(A3+A4)^2\} \cdot S \quad (4)$$

where K' is a constant obtained by multiplying the spring constant K of the coil spring 154 and the proportionality factor between the pedal stroke S and the quantity of brake fluid inflow $Q_{MC}$.

Therefore, in the brake stroke simulator 140 of this embodiment, the relationship of equation (4) is established between the master cylinder pressure $P_{MC}$ and the pedal stroke S under the condition that both the third piston 142 and the fourth piston 144 are displaced as the pedal stroke S changes, that is, under the condition that the displacement L of the third piston 142 and the fourth piston 144 is less than the predetermined distance G3.

In the brake apparatus employing the brake stroke simulator 140 of this embodiment, the third piston 142 contacts the piston stopper 156 when the pedal stroke S reaches a predetermined amount. After the third piston 142 has contacted the piston stopper 156, the displacement of the third piston 142 cannot be increased any more even if the quantity of brake fluid inflow $Q_{MC}$ increases with an increase in the pedal stroke S. Therefore, after the third piston 142 has contacted the piston stopper 156, only the displacement L of the fourth piston 144 increases if the pedal stroke S further increases.

In a range where only the displacement L of the fourth piston 144 increases, with increases in the pedal stroke S, the relationship between the quantity of brake fluid inflow $Q_{MC}$ and the displacement L of the fourth piston 144 becomes a relationship expressed as:

$$Q_{MC} = G3 \cdot A3 + L \cdot A4 \quad (5)$$

Assuming that the amount of elastic deformation of the coil spring 154 equals the displacement L of the fourth piston 144, the relationship between the displacement L and the master cylinder pressure $P_{MC}$ can be expressed as in the following equation using the spring constant K of the coil spring 154.

$$K \cdot L = P_{MC} \cdot A4 \quad (6)$$

From equations (5) and (6), the relationship between the amount of brake fluid inflow $Q_{MC}$ and the master cylinder pressure $P_{MC}$ can be written as:

$$P_{MC} = K \cdot (Q_{MC} - G3 \cdot A3)/A4^2 \quad (7)$$

A substantially proportional relationship is established between the quantity of brake fluid inflow $Q_{MC}$ and the pedal stroke S. Therefore, using equation (7), the relationship between the pedal stroke S and the master cylinder pressure $P_{MC}$ can be expressed as:

$$P_{MC} = (K'/A4^2) \cdot S - P_0 \quad (8)$$

where K' is a constant obtained by multiplying the spring constant K of the coil spring 154 and the proportionality factor between the pedal stroke S and the quantity of brake fluid inflow $Q_{MC}$, and P0 is a constant expressed as $P_0 = K \cdot G3 \cdot A3 / A4^2$.

In short, in the brake stroke simulator 140 of this embodiment, the master cylinder pressure $P_{MC}$ changes at a relatively small gradient $K'/(A3+A4)^2$ with changes in the pedal stroke S in a range of relatively small pedal strokes S. In a range of relatively large pedal strokes S, the master cylinder pressure $P_{MC}$ changes at a relatively large gradient $K'/A4^2$ with changes in the pedal stroke S. Therefore, the brake stroke simulator 140 is able to establish a non-linear relationship between the pedal stroke S and the pedal reaction force similar to the non-linear relationship established in the normal brake apparatus.

The characteristic of the brake stroke simulator 140 of this embodiment is determined mainly by the factors of the third piston 142, the factors of the fourth piston 144 and the factors of the coil spring 154. The variations of the factors of the coil spring 154 can be relatively easily reduced to a small range during the production process thereof. Therefore, the brake stroke simulator 140 of this embodiment makes it possible to easily secure constant product quality without allowing large characteristic variations among individual simulators.

The fourth embodiment achieves a non-linear pedal reaction force characteristic by using only one coil spring 154 to urge the third piston 142 and the fourth piston 144 and differing the gap G3 between the third piston 142 and the piston stopper 156 and the gap G4 between the fourth piston 144 and the piston stopper 156 from each other. However, the invention is not limited by this embodiment. Various other manners can be employed to differ the master cylinder pressure $P_{MC}$ at which the third piston 142 reaches the end of displacement and the master cylinder pressure $P_{MC}$ at which the fourth piston 144 reaches the end of displacement from each other. For example, it is also possible to provide a third piston and a fourth piston independently of each other and provide springs of different spring constants for urging the third piston and the fourth piston separately.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. A brake stroke simulator for use with a master cylinder, comprising:
    a first piston displaceable upon receipt of pressure from the master cylinder, the first piston being displaceable over a first distance and a second distance;
    a second piston displaceable with the first piston over the second distance after the first piston has been displaced over the first distance;
    a first spring that urges the first piston away from the second piston;
    a second spring that urges the second piston toward the first piston; and
    an elastic member disposed in a contact position between the first piston and the second piston.

2. A brake stroke simulator according to claim 1, further comprising:
    a housing in which the first piston is positioned; and
    a check valve-type cup seal provided between the first piston and the housing, the check valve cup seal substantially preventing leakage resulting from pressure from the master cylinder.

3. A brake stroke simulator according to claim 1, the first piston including a tubular portion, and the second piston including a fitting portion, the fitting portion slidably positioned within the tubular portion.

4. A brake stroke simulator according to claim 3, wherein the first spring is positioned within the tubular portion.

5. A brake system, comprising:

the brake stroke simulator according to claim 1;

a brake pedal;

the master cylinder that generates a master cylinder pressure in accordance with movement of the brake pedal;

a pressure generator that produces a pressure equal to the master cylinder pressure;

a wheel cylinder;

a pressure changeover system that changes pressure supplied to the wheel cylinder to one of the master cylinder pressure and the pressure produced by the pressure generator; and a fluid passage connecting the wheel cylinder and the master cylinder;

wherein, the brake stroke simulator is in communication with the fluid passage connecting the wheel cylinder and the master cylinder, and the pressure changeover system is provided on a same side of the brake stroke simulator as the wheel cylinder.

6. A brake system according to claim 5, wherein the brake stroke simulator receives only the master cylinder pressure.

* * * * *